(12) United States Patent
Otaki et al.

(10) Patent No.: US 12,434,847 B2
(45) Date of Patent: Oct. 7, 2025

(54) FLIGHT VEHICLE AND MAAS PROVISION METHOD

(71) Applicant: TOYOTA JIDOSHA KABUSHIKI KAISHA, Toyota (JP)

(72) Inventors: Yoshifumi Otaki, Nisshin (JP); Hirofumi Taniguchi, Yokohama (JP); Hiroto Tsukamoto, Wako (JP); Toshimitsu Saijo, Nisshin (JP); Daisaku Higashi, Nagoya (JP); Naoya Oka, Nagoya (JP); Daiki Kaneichi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/906,638

(22) Filed: Oct. 4, 2024

(65) Prior Publication Data

US 2025/0236403 A1   Jul. 24, 2025

(30) Foreign Application Priority Data

Jan. 23, 2024   (JP) ................. 2024-008291

(51) Int. Cl.
  *B64D 27/357*   (2024.01)
  *G05D 1/20*   (2024.01)
  *G05D 109/22*   (2024.01)

(52) U.S. Cl.
  CPC ............ *B64D 27/357* (2024.01); *G05D 1/20* (2024.01); *G05D 2109/23* (2024.01)

(58) Field of Classification Search
  CPC ........ B64D 27/357; B64D 27/35; G05D 1/20; G05D 2109/23
  See application file for complete search history.

(56) References Cited

U.S. PATENT DOCUMENTS

| | | | |
|---|---|---|---|
| 2017/0057650 | A1* | 3/2017 | Walter-Robinson ........................ B64D 27/357 |
| 2023/0192332 | A1* | 6/2023 | Yamato .............. G06Q 10/0631 244/60 |
| 2023/0202321 | A1* | 6/2023 | Mazzei ............... B64C 29/0016 320/109 |
| 2024/0004404 | A1* | 1/2024 | Wiegman ............... G05D 1/085 |
| 2024/0199217 | A1* | 6/2024 | Saito .................... H02J 7/0014 |

FOREIGN PATENT DOCUMENTS

JP   2018-062324 A   4/2018

\* cited by examiner

*Primary Examiner* — Rodney A Bonnette
(74) *Attorney, Agent, or Firm* — SoraIP, Inc.

(57) ABSTRACT

The disclosure relates to a battery driven flight vehicle. The battery-driven flight vehicle, comprising: a control unit; and a battery charged by a power supply device, wherein the control unit executes flight control in accordance with a charging speed of the battery. The disclosure also relates to a method of providing a Mobility as a Service (MaaS) in which the flight vehicle is used.

5 Claims, 3 Drawing Sheets

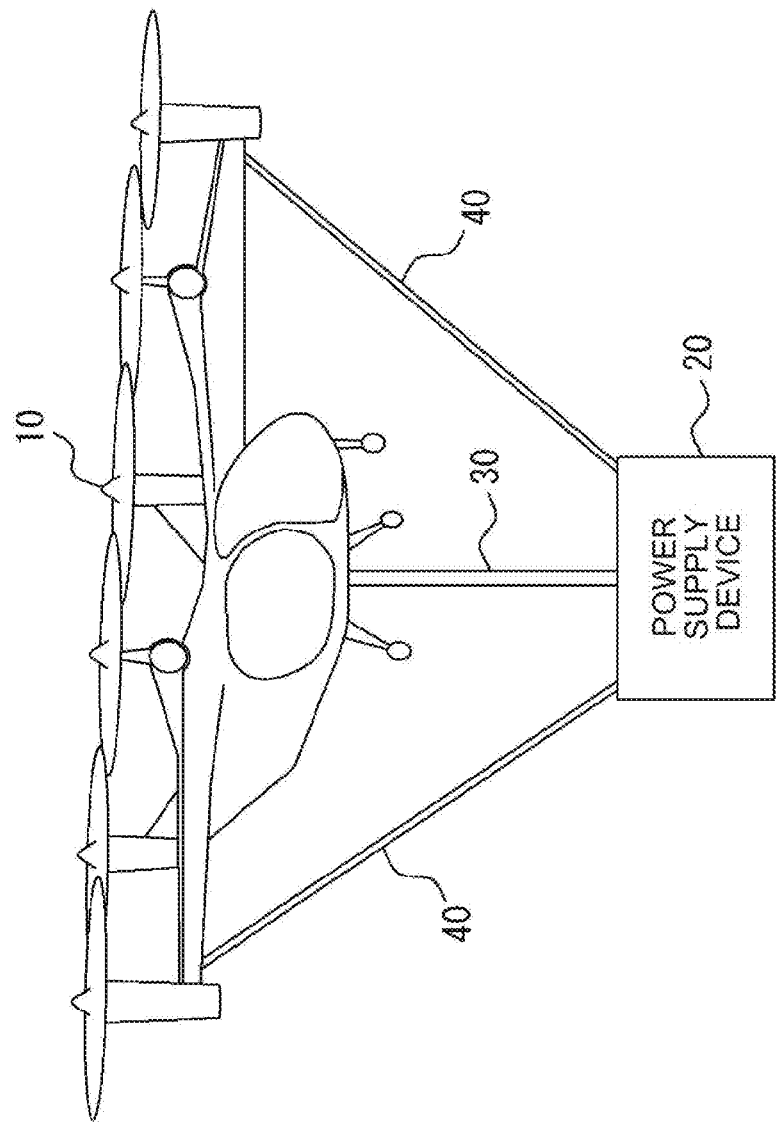

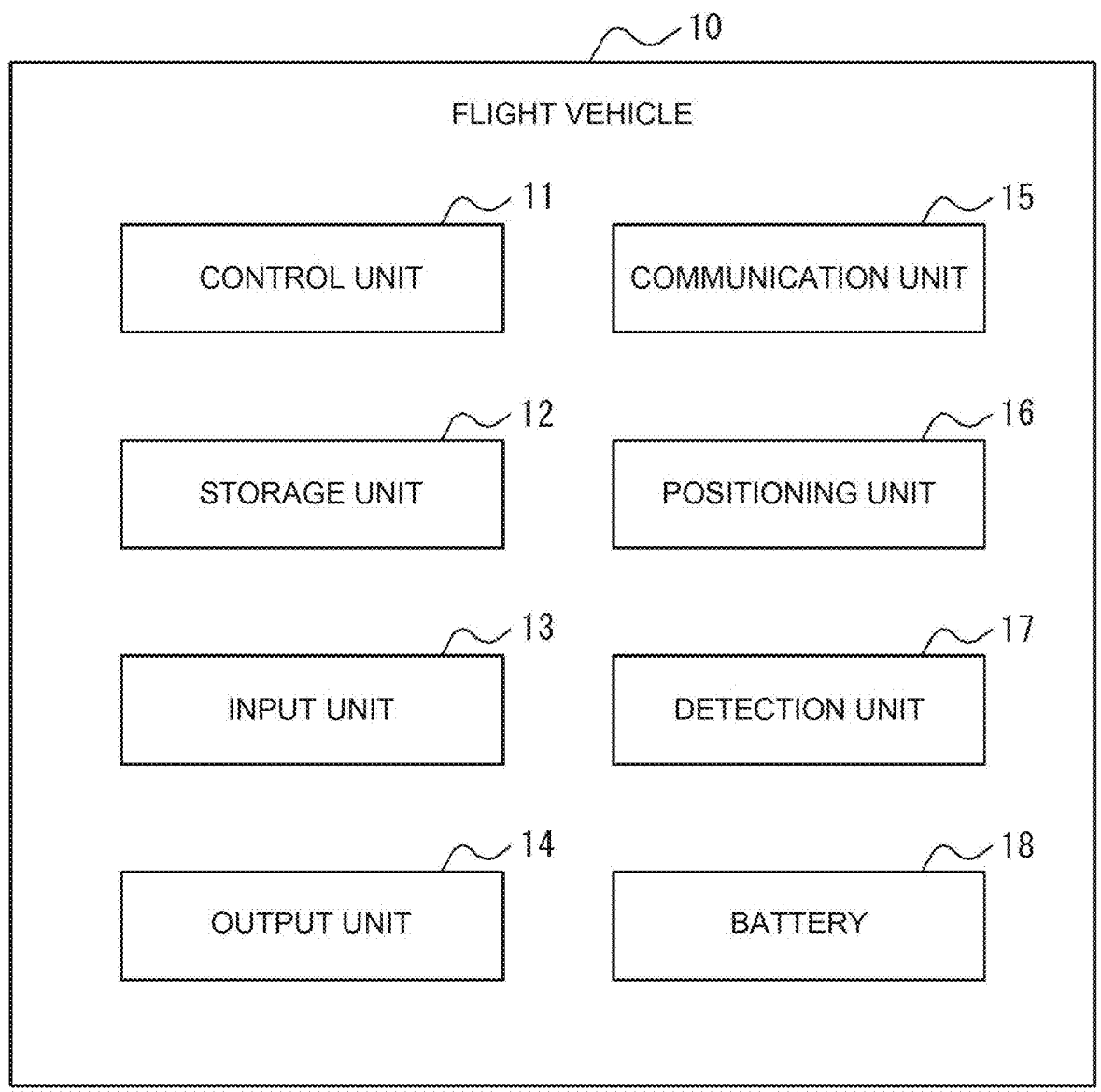

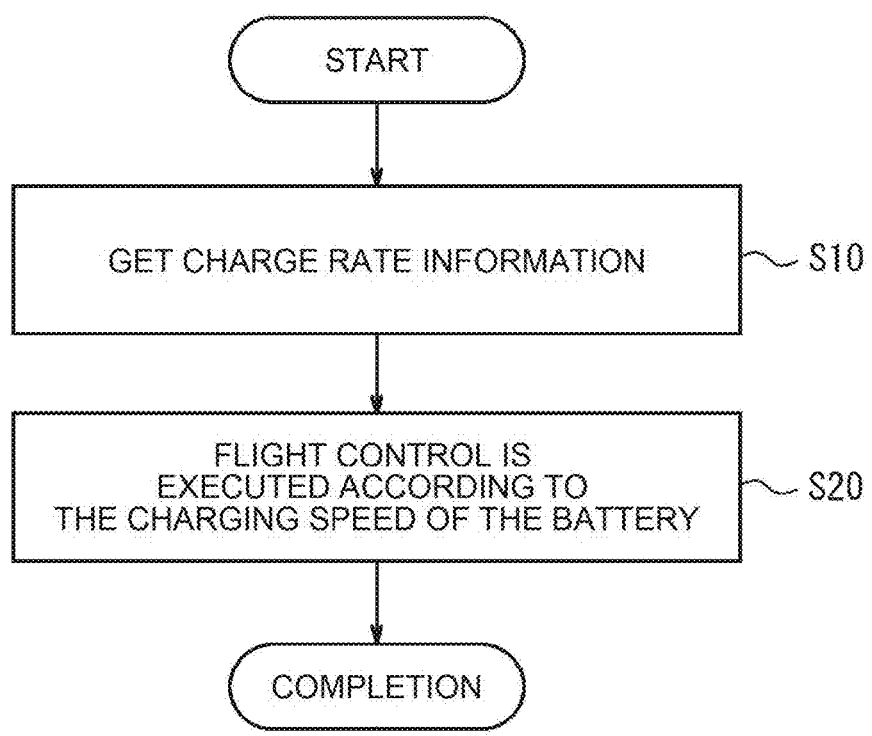

FLIGHT VEHICLE AND MAAS PROVISION METHOD

CROSS-REFERENCE TO RELATED APPLICATION

This application claims priority to Japanese Patent Application No. 2024-008291 filed on Jan. 23, 2024, incorporated herein by reference in its entirety.

BACKGROUND

1. Technical Field

The present disclosure relates to a battery driven flight vehicle and a Mobility as a Service (MaaS) provision method.

2. Description of Related Art

There has conventionally been disclosed providing an electric rotary-wing type unmanned airplane of a multi-machine connection type, in which an unmanned airplane for work and an unmanned airplane for power supply are connected by an electric cable to be able to secure the work electricity and the work time of the unmanned airplane for work (Japanese Unexamined Patent Application Publication No. 2018-62324 (JP 2018-62324 A), for example).

SUMMARY

In the technique according to JP 2018-62324 A, flight control according to the charging speed has not been studied. In other words, there is room for improvement in the technology of flight control according to the charging speed of a battery driven flight vehicle.

An object of the present disclosure made in view of such circumstances is to improve the technique of flight control according to a charging speed of a battery driven flight vehicle.

An aspect of the present disclosure provides a battery driven flight vehicle including:

a control unit; and a battery charged by a power supply device, in which the control unit executes flight control according to a charging speed of the battery.

According to the aspect of the present disclosure, the technique of flight control according to a charging speed of a battery driven flight vehicle is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram illustrating a schematic configuration of a system according to an embodiment of the present disclosure;

FIG. 2 is a block-diagram showing a schematic configuration of a flight vehicle; and FIG. 3 is a flowchart illustrating an operation of the flight vehicle.

DETAILED DESCRIPTION OF EMBODIMENTS

Hereinafter, an embodiment of the present disclosure will be described.

Outline of Embodiment

An outline of the system 1 according to the present embodiment will be described with reference to FIG. 1. The system 1 includes a flight vehicle 10 and a power supply device 20.

the flight vehicle 10 according to the present embodiment includes an electric rotor blade and is driven by a battery. For example, the flight vehicle 10 is an eVTOL (electric Vertical Take Off and Landing). eVTOL has a cabin of substantially the same size as a passenger car on which one or more passengers can ride, and mechanisms including one or more electric rotor blades for generating lift and thrust. eVTOL is at least partially steered by a VFR: Visual Flight Rules. the flight vehicle 10 is not limited to an eVTOL, and includes a helicopter, a drone, and the like. the flight vehicle 10 includes a drive mechanism including a motor for driving an electric rotor blade, a control unit thereof, and a battery for supplying electric power to the drive mechanism. The battery is, for example, a lithium-ion battery. the flight vehicle 10 may be operated by, for example, an instrument flight system (IFR: Instrument Flight Rules).

the flight vehicle 10 is connected to the power supply device 20 during flight, and the battery of the flight vehicle 10 is charged by the power supply device 20.

The power supply device 20 is a device that supplies electric power for charging the battery of the flight vehicle 10. The power supply device 20 may include, for example, a generator, a battery, or the like. If the power supply device 20 includes a generator, the power supply device 20 includes fuel. Such fuels may be, for example, gasoline, diesel, natural gas, etc.

The power supply device 20 is connected to the flight vehicle 10 by the power supply cable 30 for power supply, and charges the battery of the flight vehicle 10. The power supply cable 30 may include a refrigerant pipe that circulates a refrigerant for cooling the battery. The power supply device 20 is connected to the flight vehicle 10 by a plurality of wires 40, and is held by the wires 40 during flight of the flight vehicle 10. In other words, the power supply device 20 is suspended and held in the air by the wire 40. Accordingly, the flight vehicle 10 is charged by the power supply device 20 during flight.

First, the outline of the present embodiment will be described, and the details will be described later. the flight vehicle 10 according to the present embodiment is driven by a battery, and performs flight control according to a charging speed of the battery.

As described above, according to the present embodiment, the flight control is executed based on the charging speed of the battery of the flight vehicle 10. Therefore, the flight control technology according to the charging speed of the battery-driven flight vehicle is improved in that the flight control can be adaptively performed according to the charging speed of the battery.

Next, each configuration of the flight vehicle 10 will be described in detail.

Configuration of the Flight Vehicle

As illustrated in FIG. 2, the flight vehicle 10 includes a control unit 11, a storage unit 12, an input unit 13, an output unit 14, a communication unit 15, a positioning unit 16, a detection unit 17, and a battery 18.

The control unit 11 includes at least one processor, at least one dedicated circuit, or a combination thereof. A processor is a general-purpose processor such as CPU (central processing unit) or GPU (graphics processing unit), or a special-purpose processor specialized for a particular process. The specialized circuit is, for example, a field-programmable gate array (FPGA), or an application specific integrated circuit (ASIC). The control unit 11 executes processing related to the operation of the flight vehicle 10 while controlling each unit of the flight vehicle 10. For example, the control unit 11 controls a drive mechanism including a motor for driving the electric rotor blade.

The storage unit 12 includes at least one semiconductor memory, at least one magnetic memory, at least one optical memory, or a combination of at least two of these. The semiconductor memory is, for example, a random access memory (RAM) or a read-only memory (ROM). The RAM is, for example, a static random access memory (SRAM) or a dynamic random access memory (DRAM). The ROM is, for example, an electrically erasable programmable read only memory (EEPROM). The storage unit 12 may function as, for example, a main storage device, an auxiliary storage device, or a cache memory. The storage unit 12 stores data used for the operation of the flight vehicle 10 and data obtained by the operation of the flight vehicle 10.

The input unit 13 includes at least one input interface. The input interface is, for example, a touch screen integrally provided with a physical key, a capacitive key, a pointing device, and a display. The input interface may be, for example, a sound sensor that receives voice input, a camera that receives gesture input, or the like. The input unit 13 receives an operation of inputting data used for the operation of the flight vehicle 10. Instead of being provided in the flight vehicle 10, the input unit 13 may be connected to the flight vehicle 10 as an external input device. As the connecting method, any method such as USB (Universal Serial Bus), HDMI (registered trademark) (High-Definition Multimedia Interface), or Bluetooth (registered trademark) can be used, for example.

The output unit 14 includes at least one output interface. The output interface is, for example, a display for outputting information in video, a speaker for outputting information in audio, or the like. The display may be, for example, a liquid crystal display (LCD), an organic electroluminescence (EL) display, or the like. The output unit 14 displays and outputs data obtained by the operation of the flight vehicle 10. Instead of being provided in the flight vehicle 10, the output unit 14 may be connected to the flight vehicle 10 as an external output device. As a connection method, for example, any method such as USB, HDMI (registered trademark), or Bluetooth (registered trademark) can be used.

The communication unit 15 includes at least one external communication interface. The communication interface may be either a wired communication or a wireless communication interface. For wired communication, the communication interface is, for example, LAN (Local Area Network) interface, USB (Universal Serial Bus). For wireless communication, the communication interface is an interface corresponding to a mobile communication standard such as LTE (Long Term Evolution), 4G (4th generation), or 5G (5th generation), or an interface corresponding to short-range wireless communication such as Bluetooth. The communication unit 15 receives data used for the operation of the flight vehicle 10 and transmits data obtained by the operation of the flight vehicle 10.

The positioning unit 16 includes a sensor or a receiver for acquiring the position of the flight vehicle 10 by autonomous navigation, electronic navigation, GNSS (Global Navigation Satellite System), or the like. Sensors for autonomous navigation include, for example, acceleration sensors, gyro sensors, azimuth magnets, altimeters, etc. Receivers for electronic navigation include, for example, receivers for receiving radio waves from terrestrial radio facilities such as VOR (VHF omni-directional radio range), ILS (Instrument Landing System). Further, GNSS receiver includes, for example, GPS (Global Positioning System), QZSS (Quasi-Zenith Satellite System), BeiDou, GLONASS (Global Navigation Satellite System), and/or Galileo. The positioning unit 16 acquires position information of the flight vehicle 10 and sends the position information to the control unit 11. Here, the position information includes altitude information of the flight vehicle 10.

The detection unit 17 has an interface with one or more sensors or sensors for detecting a state or an operation of each unit of the flight vehicle 10, and sends information indicating a detection result by the sensors to the control unit 11. The sensors include a drive mechanism including a motor, a sensor that detects a state or an operation such as a rotation speed of the propeller, a remaining charge amount of the battery 18, a temperature, and a charging speed. Further, the sensors include a wind speed sensor, a wind direction sensor, an air temperature sensor, an atmospheric pressure sensor, a humidity sensor, an illuminance sensor, a rainfall sensor, a camera, and the like that detect a state of an external environment of the flight vehicle 10.

The battery 18 supplies electric power to the driving mechanism of the flight vehicle 10. The battery 18 may be, for example, a lithium ion battery, a solid electrolyte battery, a nickel-metal hydride battery, or the like. The battery 18 can be charged by the power supply device 20.

Operation of the Flight Vehicle

The operation of the system 1 according to the present embodiment will be described with reference to FIG. 3.

S10: The control unit 11 of the flight vehicle 10 acquires information (hereinafter, also referred to as charge rate information) related to the charge rate of the battery 18.

An arbitrary method can be adopted for acquiring the charging rate information. For example, the control unit 11 may acquire charging speed information from the detection unit 17.

S20: The control unit 11 executes flight control based on the charge rate data. In other words, the control unit 11 executes flight control according to the charging speed.

The flight control according to the charging speed includes, for example, at least one of a flight speed, a flight altitude, and a change in the rotation speed of the propeller. For example, the flight control may include a change in the flight speed, and the control unit 11 may increase the flight speed as the charging speed increases. The higher the charging rate, the higher the temperature of the battery 18. Therefore, by increasing the flight speed, it is possible to efficiently suppress the temperature rise of the battery 18.

Further, for example, the flight control may include a change in the flight altitude, and the control unit 11 may increase the flight altitude as the charging speed increases. As described above, the higher the charging rate, the higher the temperature of the battery 18. Therefore, by increasing the flight altitude, it is possible to efficiently suppress the temperature rise of the battery 18.

Further, for example, the flight control may include a change in the rotation speed of the propeller, and the control unit 11 may increase the rotation speed of the propeller as the charging speed increases. As described above, the higher the charging rate, the higher the temperature of the battery 18. Therefore, by increasing the rotational speed of the propeller, the flight speed can be increased, and thus the temperature rise of the battery 18 can be efficiently suppressed.

As described above, the control unit 11 of the flight vehicle 10 according to the present embodiment executes the flight control based on the charging speed of the battery 18 of the flight vehicle 10. Therefore, the flight control technique according to the charging speed of the battery-driven flight vehicle 10 is improved in that the flight control can be adaptively performed according to the charging speed of the battery 18.

Although the present disclosure has been described above based on the drawings and the embodiment, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, the control unit 11 may execute the flight control according to the environment information. Such environmental information may include at least one of outside air temperature, wind speed, weather information, and atmospheric pressure. The temperature rise during charging of the battery 18 may be different depending on the outside air temperature, the wind speed, the weather information, the atmospheric pressure, and the like. Therefore, the control unit 11 may execute the flight control based on the environmental information. For example, when the outside air temperature at the flight altitude is low, an increase in temperature during charging of the battery 18 is suppressed, and the control unit 11 may execute the flight control in consideration of the outside air temperature.

Further, for example, in the present embodiment, the one flight vehicle 10 and the power supply device 20 are connected by the wire 40 to hold the power supply device 20 during flight, but the present disclosure is not limited thereto. For example, the power supply device 20 may be held in flight by connecting the plurality of flight vehicles 10 and the power supply device 20 with the wires 40. In this way, the load of the power supply device 20 can be distributed to a plurality of flight vehicles 10. When the power supply device 20 is held by the plurality of flight vehicles 10, it is necessary to coordinate flight control of the plurality of flight vehicles 10. For example, the flight speed and the flight altitude of the plurality of flight vehicles 10 should be substantially the same. When the flight control of the plurality of flight vehicles 10 is coordinated, the control unit 11 of one of the plurality of flight vehicles 10 (hereinafter, also referred to as a master) may acquire its own charging speed information and determine the flight control of the plurality of flight vehicles 10. The control unit 11 of the master flight vehicle 10 may transmit information related to the determined flight control to another flight vehicle 10 (hereinafter, also referred to as a slave) via the communication unit 15. The control unit 11 of the slave flight vehicle 10 executes its own flight control based on the flight control information received from the master.

Further, for example, the flight vehicle 10 and the power supply device 20 may not be connected by the wire 40. For example, the power supply device 20 may be attachable to the outside of the flight vehicle 10. Alternatively, the power supply device 20 may be provided inside the flight vehicle 10.

Further, for example, in the above-described embodiment, the configuration and operation of the flight vehicle 10 may be distributed among a plurality of computers capable of communicating with each other. For example, an embodiment in which some of the components of the flight vehicle 10 are provided in an external server device is also possible.

In one embodiment, the flight vehicle 10 may be used to provide MaaS (Mobility as a Service), which is a mobility-based service. In one embodiment, the process of the flow chart of FIG. 3 may be executed when providing a MaaS using the flight vehicle 10. In this case, the information processing method according to the above-described processing procedure is an exemplary method of providing a MaaS using the flight vehicle 10.

What is claimed is:

1. A battery driven flight vehicle comprising:
    a control unit; and
    a battery charged by a power supply device, wherein the control unit executes flight control according to a charging speed of the battery.

2. The battery driven flight vehicle according to claim 1, wherein the flight control includes changing at least one of a flight speed, a flight altitude, and a rotational speed of a propeller.

3. The battery driven flight vehicle according to claim 2, wherein the flight control includes changing the flight speed, and the control unit increases the flight speed as the charging speed increases.

4. The battery driven flight vehicle according to claim 1, wherein the flight control is also executed according to environmental information.

5. The battery driven flight vehicle according to claim 4, wherein the environmental information includes at least one of an outside air temperature, a wind speed, weather information, and an atmospheric pressure.

* * * * *